United States Patent
Bustelo et al.

(10) Patent No.: US 7,735,069 B2
(45) Date of Patent: Jun. 8, 2010

(54) CREATING SOFTWARE DEBUG BREAKPOINTS ACTIVATED BY SPECIFIC CALL PATTERNS

(75) Inventors: Leugim A. Bustelo, Austin, TX (US); Andrew Hately, Austin, TX (US); Julio E. Ruano, Austin, TX (US); Alexander H. Tarpinian, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 11/351,022

(22) Filed: Feb. 9, 2006

(65) Prior Publication Data

US 2007/0240123 A1    Oct. 11, 2007

(51) Int. Cl.
*G06F 9/44*    (2006.01)
(52) U.S. Cl. .................................................. 717/129
(58) Field of Classification Search ......... 717/128–129, 717/124–125
See application file for complete search history.

(56) References Cited

U.S. PATENT DOCUMENTS

| | | | | |
|---|---|---|---|---|
| 5,970,248 | A * | 10/1999 | Meier | 717/125 |
| 6,240,545 | B1 | 5/2001 | Carmichael et al. | |
| 6,240,549 | B1 * | 5/2001 | Hamada et al. | 717/130 |
| 6,493,868 | B1 * | 12/2002 | DaSilva et al. | 717/105 |
| 7,530,053 | B2 * | 5/2009 | Pugh et al. | 717/124 |
| 2004/0205728 | A1 * | 10/2004 | Hanson | 717/129 |
| 2005/0273757 | A1 * | 12/2005 | Anderson | 717/100 |
| 2007/0043547 | A1 * | 2/2007 | Plun et al. | 703/13 |
| 2007/0074168 | A1 * | 3/2007 | Bates et al. | 717/124 |
| 2007/0300209 | A1 * | 12/2007 | Bates et al. | 717/129 |
| 2008/0141222 | A1 * | 6/2008 | Alpern | 717/125 |
| 2009/0089764 | A1 * | 4/2009 | Lai et al. | 717/143 |

OTHER PUBLICATIONS

Xu et al. "Automatic diagnosis and response to memory corruption vulnerabilities", Nov. 2005, ACM, pp. 224-234.*
Ho et al. "On the Design of a Pervasive Debugger", Sep. 2005, ACM, pp. 117-121.*

* cited by examiner

*Primary Examiner*—Wei Y Zhen
*Assistant Examiner*—Anna Deng
(74) *Attorney, Agent, or Firm*—Jill Poimboeuf; Gregory K Goshorn; Greg Goshorn, P.C.

(57) ABSTRACT

Provided is a method for defining and organizing computer breakpoints for use during a debugging operation of a software application. The claimed subject matter provides flexible breakpoints that are called depending upon the condition of the corresponding call-stack or, in other words, depending upon a specific calling sequence through which the module containing the breakpoint was reached. A novel type of breakpoint is provided that, rather than causing a halt in execution of a module, changes the state of one or more other breakpoints. In an alternative embodiment, a breakpoint is provided that determines whether or not to execute based upon an examination of the call-stack.

12 Claims, 7 Drawing Sheets

BreakpointDescriptorObject (252)

254:
- 258: bpdID:     BPDObjectID
- 260: applicationID:     ApplicationID
- 262: moduleID:     ModuleID
- 264: lineNo     Integer
- 266: conditionYesNo     Boolean
- 268: calculateBefore     Boolean
- 270: condition     String
- 272: referenceModule     Vector
- 274: bpdIDPointer     Vector
- 276: bpEnabled     Boolean
- 278: DisableAfterExecution     Boolean 256:
- 280: Boolean checkCondition (condition: String)
- 282: BPDObjectID getBPD (referenceBP: BPDObjectID)
- 284: Boolean checkCallStack (modules: Vector)

CREATING SOFTWARE DEBUG BREAKPOINTS ACTIVATED BY SPECIFIC CALL PATTERNS

TECHNICAL FIELD

The present invention relates generally to software development and, more specifically, to a method for debugging software.

BACKGROUND OF THE INVENTION

As computers have become faster and available memory has increased, software has also become more and more complex. Today, a typical software application may contain millions of lines of code. With the increased complexity of software applications, the issues associated with writing the code, a task often undertaken by large groups of programmers working concurrently, have become more numerous and difficult to resolve. Correcting mistakes in computer code during development, or "debugging," has become particularly difficult as code complexity has increased.

When debugging an application, it is common to encounter a block of code that needs to be inspected. Typically, a programmer inserts a special instruction called a breakpoint into the block of code. A breakpoint is a special instruction inserted into code by a programmer and a software complier that halts a program during execution so that the programmer can, by means of a debugging program, examine the state of the executing code and computing system and, perhaps, determine the source of a software bug. Some blocks of code need to be inspected under certain calling scenarios and not others. Current debugging techniques only enable the developer to specify specific calling scenarios under very limited conditions. In other words, in the current state of the art, breakpoints cannot be made dependant upon a designated execution path. This limitation is particularly a problem in object-oriented programming system in which code reuse is prevalent.

For example, if "M" is a module reused by a number of other modules, "B" is a breakpoint within M and "O" is a breakpoint within a module "N" outside of module M that calls M, a user can enable breakpoint B during the halt in execution caused by breakpoint O. Of course, this procedure is awkward, could benefit from automation and does not address the issue of disabling breakpoint B once module N has finished executing.

Another available debugging technique is the use of conditional breakpoints. A conditional breakpoint is one in which the corresponding module is halted only if certain conditions are met. For example, a breakpoint "C' may be activated only if a certain variable exceeds a predefined value. In current technology, conditional breakpoints can only depend upon conditions within the scope of the module in which the breakpoint is located.

What is needed is a system of breakpoints that can be made dependant upon the calling sequence. In other words, it would be advantageous if a particular breakpoint could be called or not depending upon the specific modules through which the breakpoint is reached.

SUMMARY OF THE INVENTION

Provided is a method for defining and organizing computer breakpoints for use during a debugging operation of a software application. Currently, breakpoints are either always called or called depending upon conditions present within the scope of the module in which the breakpoint is located. The claimed subject matter provides flexible breakpoints that are called depending upon the condition of the corresponding call-stack or, in other words, depending upon a specific calling sequence through which the module containing the breakpoint was reached.

A novel type of breakpoint is provided that, rather than causing a halt in execution of a module, changes the state of one or more other breakpoints. In the following example, "M" is a module reused by a number of other modules, "B" is a breakpoint within M, "N" is a module that calls module M and "O" is a breakpoint within module N. When Breakpoint "O" is enabled and reached during execution of module N, breakpoint O does not halt the execution of module N but rather enables breakpoint B in module M. In addition, when execution returns to breakpoint O and module N after a call to module M, breakpoint O disables breakpoint B. In this manner, breakpoint B is enabled when module M is reached via module N and disabled when reached by any other module not so configured. This embodiment of the claimed subject matter has the additional benefit of being able to enable breakpoint B even though module M and module N are not part of the same call-stack, i.e. executing on different threads in a multi-threaded process.

In an alternative embodiment, breakpoint B is a novel conditional type of breakpoint that determines whether or not to execute based upon an examination of the call-stack. In other words, when breakpoint B is reached, a process determines whether or not a particular module or modules are represented within the call-stack. If not, execution proceeds as though the breakpoint is disabled. If the particular modules are detected in the call-stack, then breakpoint B is enabled, module M is halted and standard breakpoint procedures are executed.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures, in which:

FIG. 5 is an exemplary breakpoint descriptor memory object used to store information for controlling the disclosed breakpoints.

DETAILED DESCRIPTION OF THE FIGURES

Although described with particular reference to an object oriented (OO) programming system, the claimed subject matter can be implemented in any information technology (IT) system in which a flexible method of application is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for introducing novel breakpoints into computer applications. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
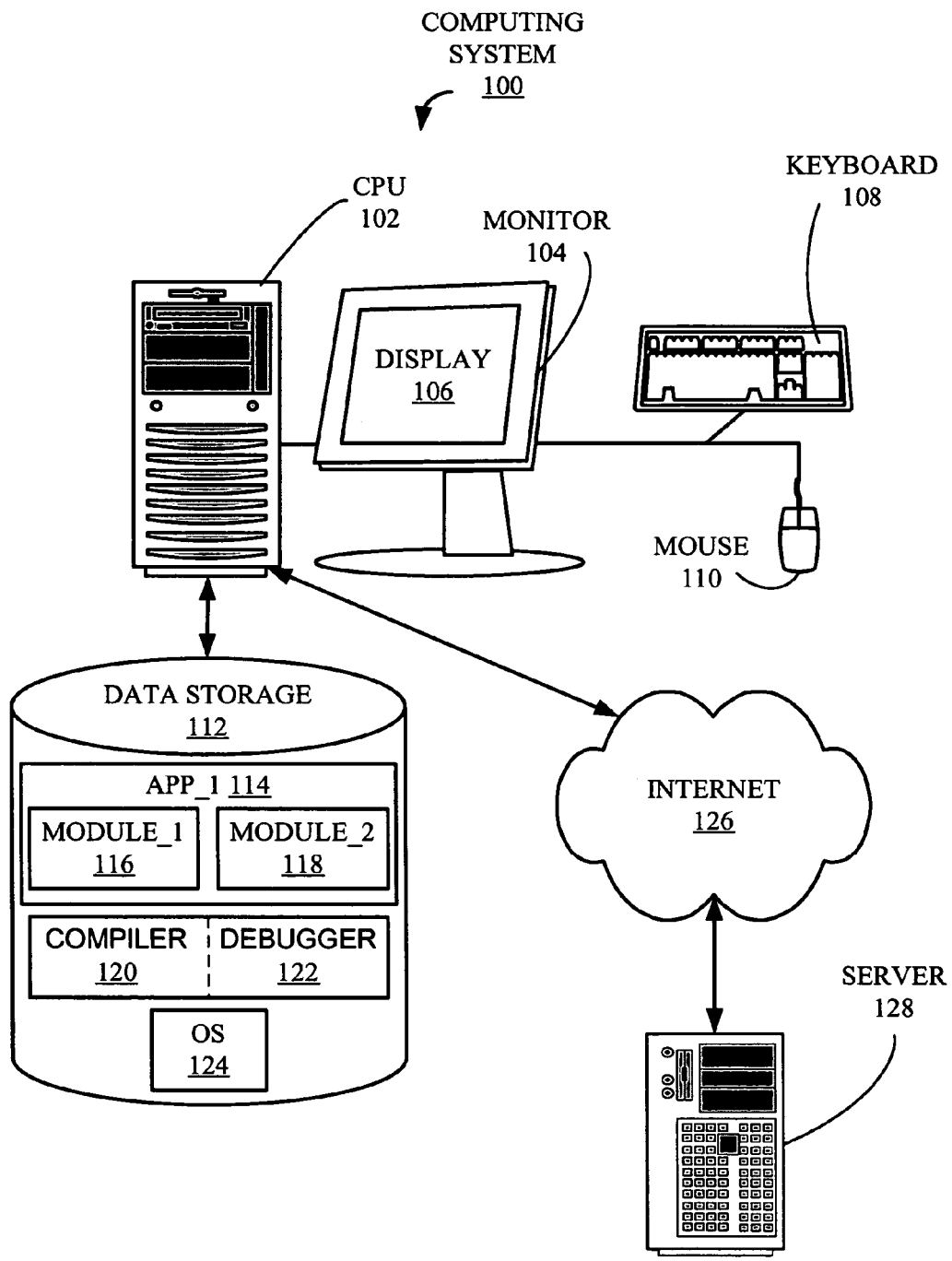
FIG. 1 is a block diagram of an exemplary computing system that incorporates the claimed subject matter.

Turning now to the figures, FIG. 1 is a block diagram of an exemplary computing system architecture 100 that incorporates the claimed subject matter. A central processing unit (CPU) 102 is coupled to a monitor 104, a keyboard 108 and a mouse 110, which together facilitate human interaction with computing system 100. Within monitor 104 is a display 106 (see FIGS. 2-4) that presents a graphical user interface (GUI) for applications such as an exemplary application, or "App_1," 114. CPU 102 is coupled to a data storage component 112, which may either be incorporated into CPU 102 i.e. an internal device, or attached externally to CPU 102 by means of various, commonly available connection devices such as but not limited to, a universal serial bus (USB) port (not shown). Data storage 112 is illustrated storing exemplary software application, or "App_1," 114, which includes two (2) exemplary computer programming modules, i.e. a "Module_1," 116 and a "Module_2," 118. Module_1 116 is shown in more detail below in conjunction with FIG. 2. It should be noted that a typical computing system would include more than one application and a typical application would include more than two (2) modules, but for the sake of simplicity only one application and two modules are shown. Also stored on data storage 112 is a compiler 120, which includes a debugger component 122. Compiler 120 and debugger 122 are configured to implement the claimed subject matter, as explained in more detail below in conjunction with FIGS. 2-7.

CPU 102 is connected to the Internet 126, which is also connected to a server computer 128. Although in this example, CPU 104 and server 128 are communicatively coupled via the Internet 126, they could also be coupled through any number of communication mediums such as, but not limited to, a local area network (LAN) (not shown). Further, it should be noted there are many possible computing system configurations that may support the claimed subject matter, of which computing system 100 is only one simple example.

Figure 2:
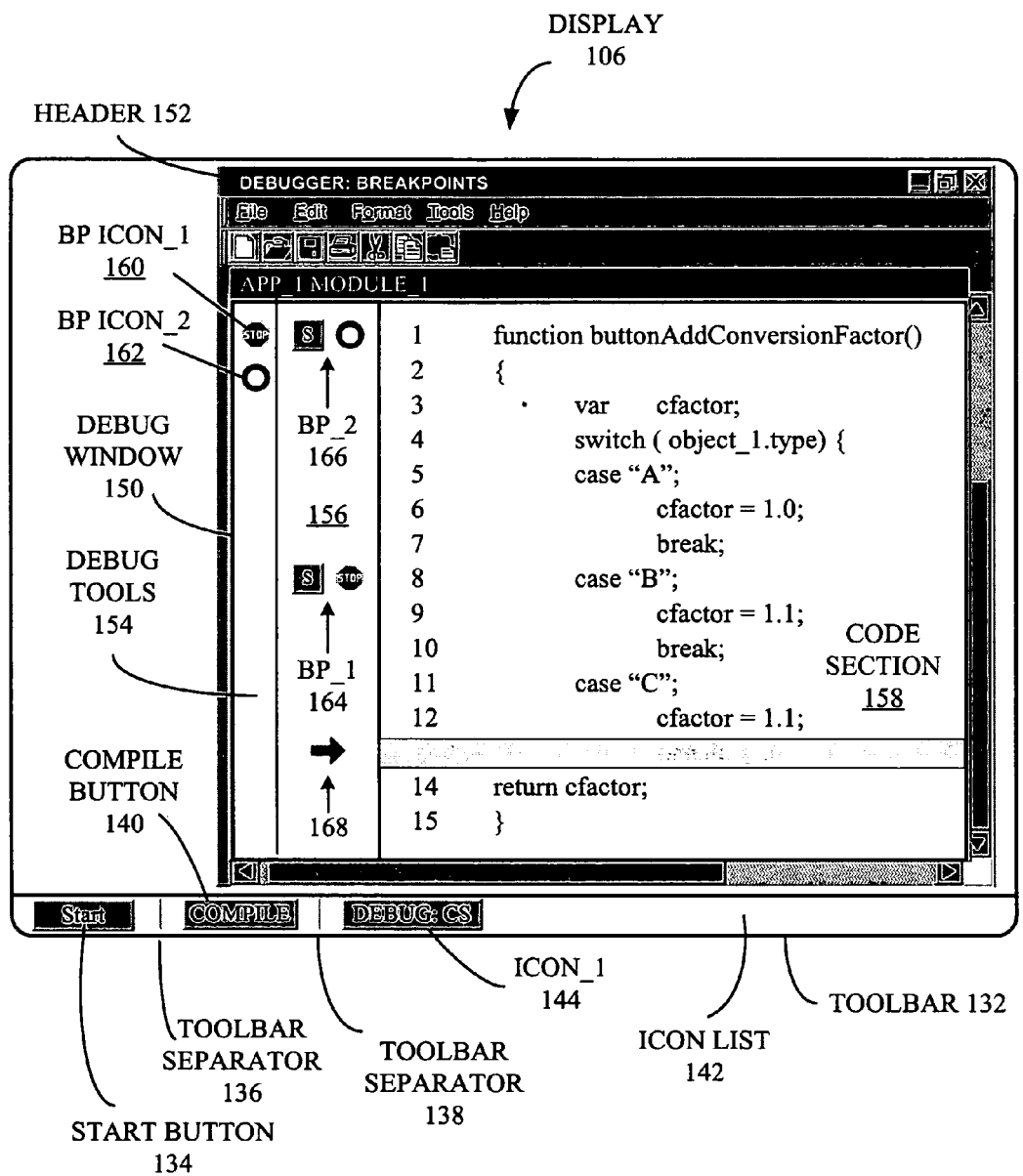
FIG. 2 is an illustration of the display of FIG. 1 in more detail, showing a first exemplary window associated with the debugger of FIG. 1.

FIG. 2 is an illustration of display 106 (FIG. 1) as viewed on monitor 104 (FIG. 1) in more detail, showing an exemplary debug window 150. In this example, debug window 150 is part of a GUI displayed in conjunction with debugger 122 (FIG. 1). Other parts of the GUI associated with debugger 122 are described below in conjunction with FIGS. 3 and 5.

A toolbar 132 extends along the bottom of display 106 from the left edge to the right edge of the screen associated with monitor 104. Within toolbar 132 are a "Start" button 134 and two toolbar separators 136 and 138. In between toolbar separators 136 and 138 is an area that will be referred to a "Quick Launch" area. Quick Launch area displays icons that initiate corresponding applications or utilities when the user positions a cursor (not shown) over a particular icon and presses, or "clicks," a button (not shown) on mouse 110 (FIG. 1).

A compile button 140, shown within the Quick Launch area of toolbar 132, initiates an executable program associated with compiler 120 (FIG. 1) and debugger 122. Processing associated with compiler 120 and associated debugger 122 is described in more detail below in conjunction with FIGS. 6 and 7. To the right of toolbar separator 138 in toolbar 132 is an Icon List area 142, which includes an Icon_1 144 that corresponds to a "Debugger: Call Stack (CS)" window 170 (see FIG. 3). Those with skill in the computing arts should be familiar with toolbars, quick launch and icon areas as well as the use of a mouse, cursor and icons to initiate actions on computing system 100. Further, it should be understood that icons are sometimes referred to as "buttons" in that actions occur when icons are clicked in much the same way that actions occur when physical buttons, such as those on mouse 110, are pressed. In addition, although illustrated with keyboard 108 and mouse 110, those with skill in the computing arts should appreciate that are many types of computing system interfaces including, but not limited to, systems with touch screens, track balls and keypads.

Debug window 150 includes a header 152 that shows the name of window 150, i.e. "Debugger: breakpoints;" various menu items, i.e. "File," "Edit" and so on; and various icons that initiate specific actions of debugger 122. It should be noted, that window 150 is used only as an example to describe the functionality of the claimed subject matter. Those with skill in the computing arts should appreciate the significance and specific functionality of the various items of header 150.

Window 150 includes a debug tools section 154, a breakpoints section 156 and a code section 158. The code displayed in section 158 is part of a fictional piece of software used for the purposes of illustration only. In this example, the displayed code corresponds to module_1 116 (FIG. 1). The following is a listing of the sample code, used for descriptive purposes only, illustrated in code section 158 with the corresponding line numbers:

```
1:     function buttonAddConversionFactor( )
2:     {
3:         var cfactor;
4:         switch ( object_1.type)
5:         case "A";
6:             cfactor = 1.0;
7:             break;
8:         case "B";
9:             cfactor = 1.1;
10:            break;
11:        case "C";
12:            cfactor = 1.1;
13:            break;
14:    }
15:    return cfactor;
16:    }
```

Debug tools 154 includes a breakpoint (BP) icon_1 160 and a breakpoint icon_2 162. BP icon_1 160 represents a typical, un-conditional breakpoint and BP icon 162 represents a conditional icon that includes the functionality of the claimed subject mater. By moving a cursor on to one of BP icons 160 or 162, pressing and holding a left button (not shown) on mouse 110 and moving the cursor into an appropriate position in BPs section 156, a user can set a breakpoint a particular point in the code displayed in code section 158. In this example, a BP_1 164, which is a breakpoint of the type represented by icon_1 160, is assigned to line #8 of the computing code displayed in code section 158 and a BP_2 166, which is a breakpoint of the type represented by icon_2 162, is assigned to line #1 of the exemplary software code in section 158. BP_1 164 and BP_2 166 also include a setup or "S" button that causes a Breakpoint Properties window 200 (see FIG. 4) to be displayed, enabling the user to define parameters for the corresponding breakpoint. An arrow 168 indicates the current line of software code, which in this example is line #13. The current line of code is also highlighted.

Figure 3:
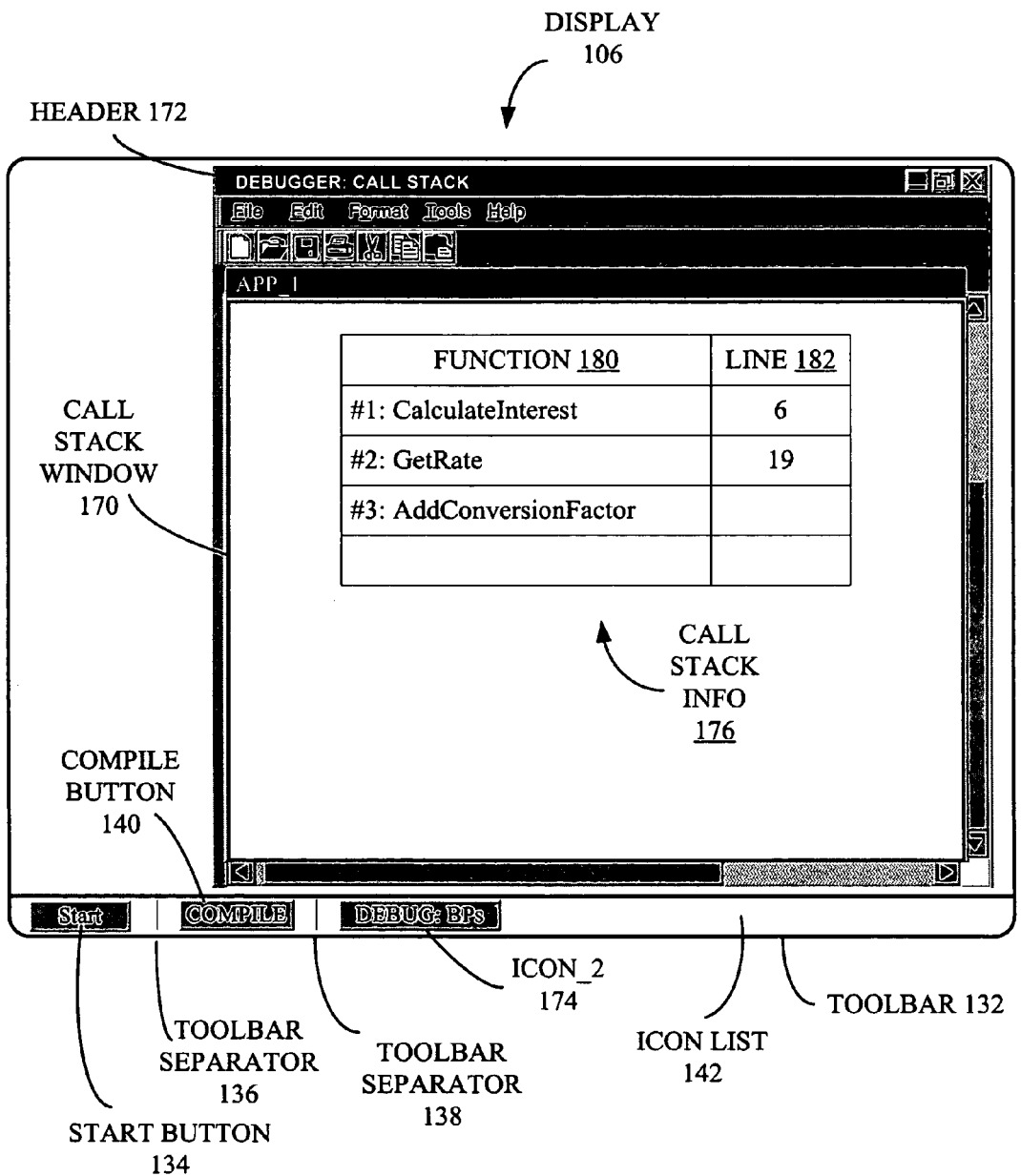
FIG. 3 is an illustration of the display of FIGS. 1 and 2 showing a second exemplary window associated with the debugger of FIG. 1.

FIG. 3 is an illustration of display 106 of FIGS. 1 and 2 showing a second exemplary window associated with the debugger of FIG. 1. Display 106, toolbar 132, start button 134, toolbar separators 136 and 138, compile button 140 and icon list 142 are the same as described above in conjunction with FIG. 2. An icon_2 174 corresponds to debug window 150 (FIG. 2), which is minimized and can be redisplayed by clicking on icon_2 174.

Illustrated in this figure is an exemplary call stack window 170. Window 170 includes a header 172, which displays the name of window 170, and displays call stack info 176, which is information on the current modules in the call stack of an application currently being debugged by debugger 122 (FIG. 1). Call stack info includes a function column 180 and a line number column 182. In this example, line #3 of column 180 indicates that the currently active module is AddConversionFactor module described above in conjunction with FIG. 2. Line #2 of column 180 indicates that AddConversion Factor was called from a module entitled GetRate and the corresponding information in Line column 182 indicates that GetRate module called AddConversionFactor from line #19 in GetRate module. In a similar fashion, line #1 of columns 180 and 182 indicate that GetRate Module was called by a CalculateInterest Module from line #6 of CalculateInterest module. The significance of call stack info 176 is explained in more detail below in conjunction with FIGS. 6 and 7.

Figure 4:
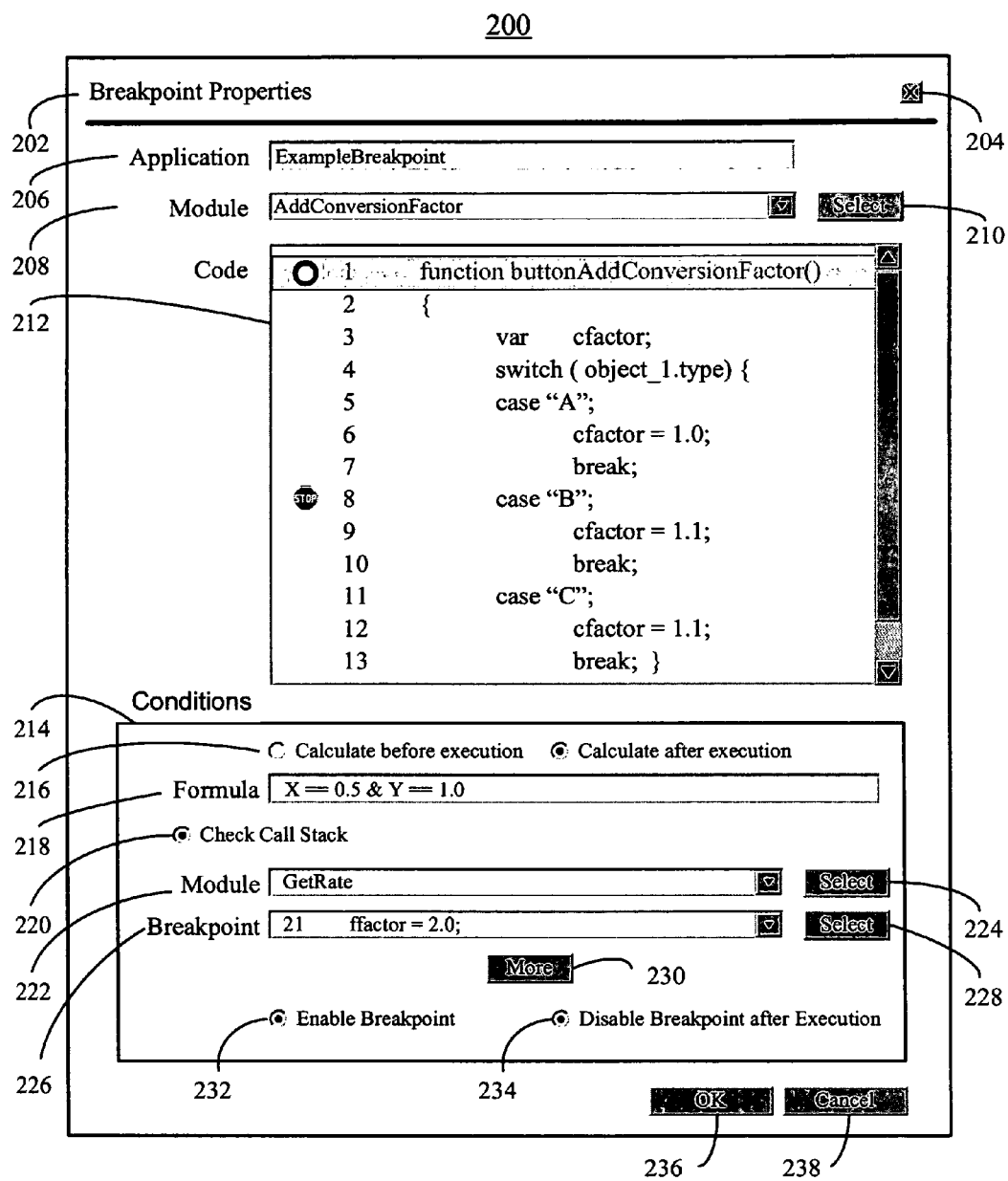
FIG. 4 is an illustration of a third exemplary window associated with the debugger of FIG. 1.

FIG. 4 is an illustration of a third exemplary window associated with debugger 122 of FIG. 1. Like window 150 (FIG. 2) and window 170 (FIG. 3), Breakpoint Properties window 200 would be displayed as part of a debugger GUI on display 106 (FIGS. 1-3). As mentioned above in conjunction with FIG. 2, window 200 is displayed when a user presses a Setup, or "S," button associated with a breakpoint icon, such as BP_1 164 or BP_2 166 (FIG. 2) and enables a user to configure a corresponding breakpoint, such as, in this example BP_2 166 associated with line #1 displayed in code section 158 (FIG. 2).

Window 200 includes a title bar 202 and a cancel button 204 that returns control of the GUI to the previous window, which in this example is debug window 150. An application text box 206 displays the current application associated with the execution of debugger 122, which, in this example, is an application entitled "ExampleBreakpoint." A module text entry box 208 enables the user to enter a particular module to display in a code display box 212. The user can also select the particular module to display by employing a select button 210 that displays a list of modules associate with the application displayed in text box 206.

When window 200 is initiated, the module displayed in text box 208 is the current module displayed in code section 158 (FIG. 2) of window 150 when the select button is clicked, or, in this example, module_1 116, entitled "AddConversionFactor." Further, the highlighted line is the line corresponding to the line highlighted in code section 158 when the mouse 110 button is clicked on the select button.

A conditions box 214 enables the user to specify conditions necessary either to activate the highlighted breakpoint or to choose between enabling and disabling a second breakpoint that is referenced by the current breakpoint. Two radio buttons 216 enable the user to specify whether the specified conditions should be applied prior to or after the execution of the corresponding line of code. A formula text entry box 218 enables the user to specify the conditions for execution. In this example, the conditions refer to values associated with two arbitrary, example variables.

A Check Call Stack radio button 220 enables the user to indicate that the activation of a referenced breakpoint should be performed based upon an examination of the call stack when the highlighted line in code section 212 is reached during execution of debugger 122. The call stack is examined for the presence of a module selected in a Module text entry box 222. In this example, the module to be detected is a GetRate module (not shown), which is listed in the exemplary call stack information 176 (FIG. 3). A select button 224 associated with box 222 enables the user to select any module from a list of available modules. A Breakpoint text entry box 226 enable the user to specify the specific breakpoint in the module displayed in box 222 that should be activated. In this example, the selected breakpoint is at line #21 of the GetRate module. A select button 228 associated with box 226 enables the user to select any breakpoint from a list of available breakpoints in the module listed in box 222. A more button 230 enables the user to specify additional modules that should be detected in the call stack as a condition for activation of the current breakpoint.

An enable breakpoint radio button 232 enables the user to turn the functionality associated with condition box 214 on or off. A Disable Breakpoint after Execution radio button 234 enable the user to specify that the corresponding breakpoint should be disabled after an encounter during the debugging of the corresponding module and application. In other words, the next time the breakpoint specified in box 226 is encountered during a debugging operation the conditions specified in box 214 must have been satisfied in the execution leading up to the encounter. An OK button 236 enables the user to save the information displayed and selected in window 200 to data structures such as a breakpoint descriptor object 250 (see FIG. 5) and return control to the previous screen in the GUI. Finally, a cancel button 238 enables the user to return control to a previous screen without saving any of the information displayed in window 200.

FIG. 5 is an exemplary breakpoint descriptor memory object 250 showing some exemplary attributes and methods that control the breakpoints according to the claimed subject matter. It should be noted that an actual implementation of object 250 may include additional or different attributes and methods not shown here.

Memory object 250 includes a title section 252, which merely states the name of object 250, i.e. "BreakpointDescriptorObject," an attribute section 254, which contains memory elements, or attributes, associated with memory object 250, and a method section 256, which includes functions, or methods, that are executed in conjunction with memory object 250.

Attribute section 254 includes a "bpdID" attribute 258, an "applicationID" attribute 260, a "moduleID" attribute 262, a "lineNo" attribute 264, a "conditionYesNo" attribute 266, a "calculateBefore" attribute 268, a "condition" attribute 270, a "referenceModule" attribute 272, a "bpdIDPointer" attribute 274, a "bpEnabled" attribute 276 and a "disableAfterExecution" attribute 278. Instantiations of object 250 are stored in data storage 112 (FIG. 1) of computing system 100 (FIG. 1) and employed by debugger 122 (FIG. 1) to implement the claimed subject matter.

BpdID attribute 258 is a variable of type BPDObjectID that contains a reference to a particular instance of object 250. Throughout this description, the object referenced by attribute 258 is referred to as the "current breakpoint." Each instance of object 250 has a unique value for attribute 258 that allows each instance to be uniquely identified. BpdID attribute 258 is employed to locate information concerning the corresponding object and to execute relevant methods of object 250. ApplicationID attribute 260 is a variable of type ApplicationID that stores a reference to a particular application or package associated with a particular instantiation of object 250. Attribute 260 corresponds to information displayed in application text box 206 (FIG. 4). ModuleID attribute 262 is a variable of type ModuleID that stores a reference to a particular module associated with the application referenced by attribute 260 and associated with the particular instantiation of object 250, i.e. the current breakpoint. Attribute 262 corresponds to information displayed in module text box 208 (FIG. 4). LineNo attribute 264 is a variable of type integer that identifies a particular line in the module referenced by attribute 262 that corresponds to the particular breakpoint associated with the current breakpoint. Attribute 264 corresponds to the line of code highlighted in code box 212 (FIG. 4).

ConditionYesNo attribute 266 is a variable of type Boolean that indicates whether or not the current breakpoint is a conditional breakpoint. In this description, a conditional breakpoint is a breakpoint that is either a traditional conditional breakpoint, a breakpoint that refers to another breakpoint in accordance with the claimed subject matter or some combination of the two. If the value of attribute 266 is equal to '0', the current breakpoint is not a conditional breakpoint. If the value of attribute 266 is equal to '1', the current breakpoint is a conditional breakpoint.

CaculateBefore attribute 268 is a variable of type Boolean that identifies whether or not the value of a particular condition specified in attribute 270 is calculated before or after the line specified in attribute 264 is executed. Attribute 268 corresponds to the two radio boxes 216 (FIG. 4). Condition attribute 270 is a variable of type String that specifies the conditions under which the breakpoint corresponding to object 250 is executed. Attribute 270 corresponds to text entry box 218 (FIG. 4). ReferenceModule attribute 272 is a variable of type Vector that specifies a list of variables of type ModuleID. The list of referenced modules correspond to modules that the user determines should appear in an application's call stack prior to executing the corresponding breakpoint(s). The use of attribute 272 is explained in more detail below in conjunction with FIG. 7.

BpdIDPointer attribute 274 is a variable of type Vector the specifies a list of variables of type BPDObjectID. Each BPDObjectID variable in the list points to another breakpoint associated with the application specified in attributes 260, i.e. the "referenced breakpoints." If data is stored in attribute 270 and no data is stored in attribute 274, the current breakpoint is a standard conditional breakpoint subject only to the condition stored in attribute 270. If attribute 274 has data that references another breakpoint or breakpoints, then the current breakpoint implements one aspect of the claimed subject matter, i.e. a breakpoint that enables one or more breakpoints without conditions. It should be noted that the GUI described in FIGS. 2-4 and memory object 250 are able to implement both standard conditional and non-conditional breakpoints and the novel breakpoint disclosed and claimed in this Specification.

BpEnabled attribute 276 is a variable of type Boolean that determines whether or not the current breakpoint should be executed or ignored when encountered during execution. DisableAfterExecution attribute 278 is a variable of type Boolean that determines whether or not the referenced breakpoint is disabled after once encountered. In other words, once enabled by the current breakpoint, the referenced breakpoint would be executed once and then disabled until the conditions for enablement were reencountered. This feature prevents a referenced breakpoint from being permanently enabled once enabled the first time and provides the user more control over the reference breakpoint.

Method section 256 of object 250 includes a "checkCondition" method 280, a "getBPD" method 282 and a "checkCallStack" method 284. Methods 280, 282 and 284 are merely example of three methods that may be employed to implement the claimed subject matter. It should be noted that other methods or utility functions (not shown) may also be provided such as, but not limited to, methods to retrieve and set variables such as attributes 260, 262, 264, 266, 268, 270, 272, 274, 276 and 278 and to do memory allocation and collection.

CheckCondition method 280 is called, with one (1) parameter, a condition parameter of data type String and returns a value of type Boolean. The return value indicates whether or not condition 270 corresponding to the breakpoint from which method 280 is called is satisfied or not. In other words, if method 280 is called with the parameter condition 270 and returns a value equal to '0', then condition 270 is not satisfied. If method returns a value equal to '1', then condition 270 is satisfied.

GetBPD method 282 is called, with one (1) parameter, a referenceBP parameter of data type BPDObjectID and returns a value of type BPDObjectID. The return value points to a reference breakpoint, if one is defined. If method 282 returns a NULL value, then the breakpoint object form which it is called does not reference another breakpoint.

CheckCallStack method 284 is called, with one (1) parameter, a module parameter of data type Vector that stores a list of variables of type moduleID and returns a value of type Boolean. The return value indicates whether or not the call stack corresponding to the breakpoint from which method 284 is called includes references to the modules referenced by the module parameter.

Figure 6:
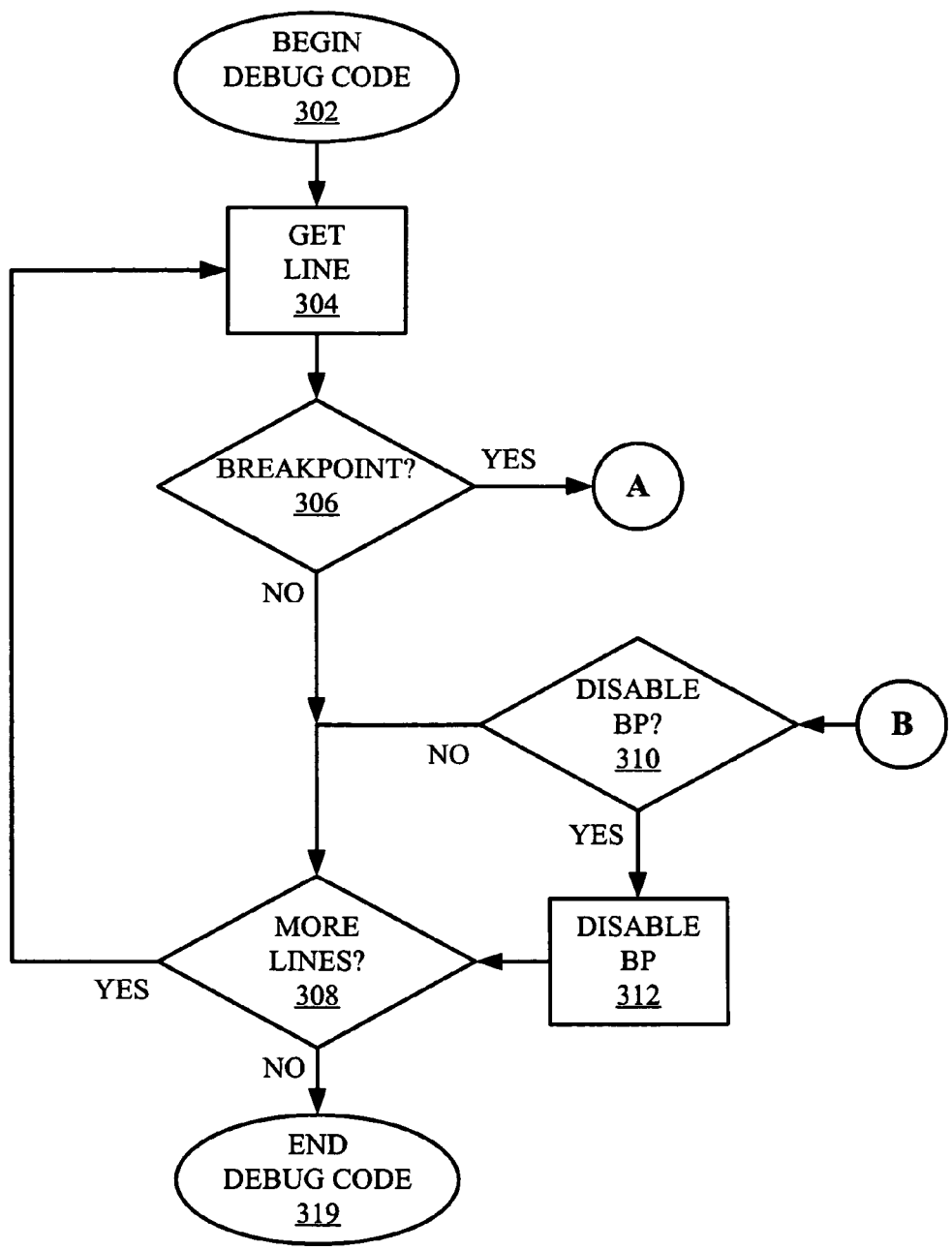
FIG. 6 is a flowchart of an exemplary debug process that employs the claimed subject matter.

FIG. 6 is a flowchart of an exemplary debug process 300 that employs the claimed subject matter. In this example, process 300 is implemented as part of debugger 122 (FIG. 1) and executed on CPU 102 (FIG. 1). Process 300 executes when an application, or the "current application," has been compiled with the appropriate debugging statements and is executed in conjunction with debugger 122.

Process 300 starts in a "Begin Debug Code" block 302 and proceeds immediately to a "Get Line" block 304. During a first iteration of block 304, process 300 executes the first line in the application that is in the process of being debugged. Control then proceeds to a "Breakpoint?" block 306 during which process 300 determines whether or not the line retrieved during block 302 is defined as a breakpoint, i.e. has an associated breakpoint object 250. If so, process 300 proceeds to a transition point A. The processing associated with transition point A is described below in conjunction with FIG. 7.

If, during block 306, process 300 determines that there is no breakpoint associated with the line retrieved during block 304, control proceeds to a "More Lines?" block 308 during which process 300 determines whether or not there are more lines in the current application to process. If so, process 300 returns to block 304 retrieves the next line and processing continues as described above. If, during block 308, process 300 determines that are not any more lines to process, control proceeds to an "End Debug Code" block 319 in which process 300 is complete. A transition point B represents a return to the portion of process 300 described in FIG. 6 from the processing accessed via transition point A and described below in conjunction with FIG. 7.

Transition point B returns to a "Disable BP?" block 310 during which process 300 determines whether of not a breakpoint referenced during a process 320 (see FIG. 7) has specified that the breakpoint should be disabled following execution. Process 300 determines this information be examining the value of disableAfterExecution attribute 278 (FIG. 5) of the corresponding reference breakpoint. If process 300 determines that the reference breakpoint should be disabled, control proceeds to a "Disable BP" block 312 during which the appropriate breakpoint is disabled by setting attribute 276 (FIG. 5) to a value of '0' in the corresponding memory object 250. Finally, if process 300 determines during block 310 that a reference breakpoint, if one exists, is designated as one that should be disabled after execution, or after one is disabled during block 312, process 300 proceeds to More Lines? Block 308 and processing continues as described above.

Figure 7:
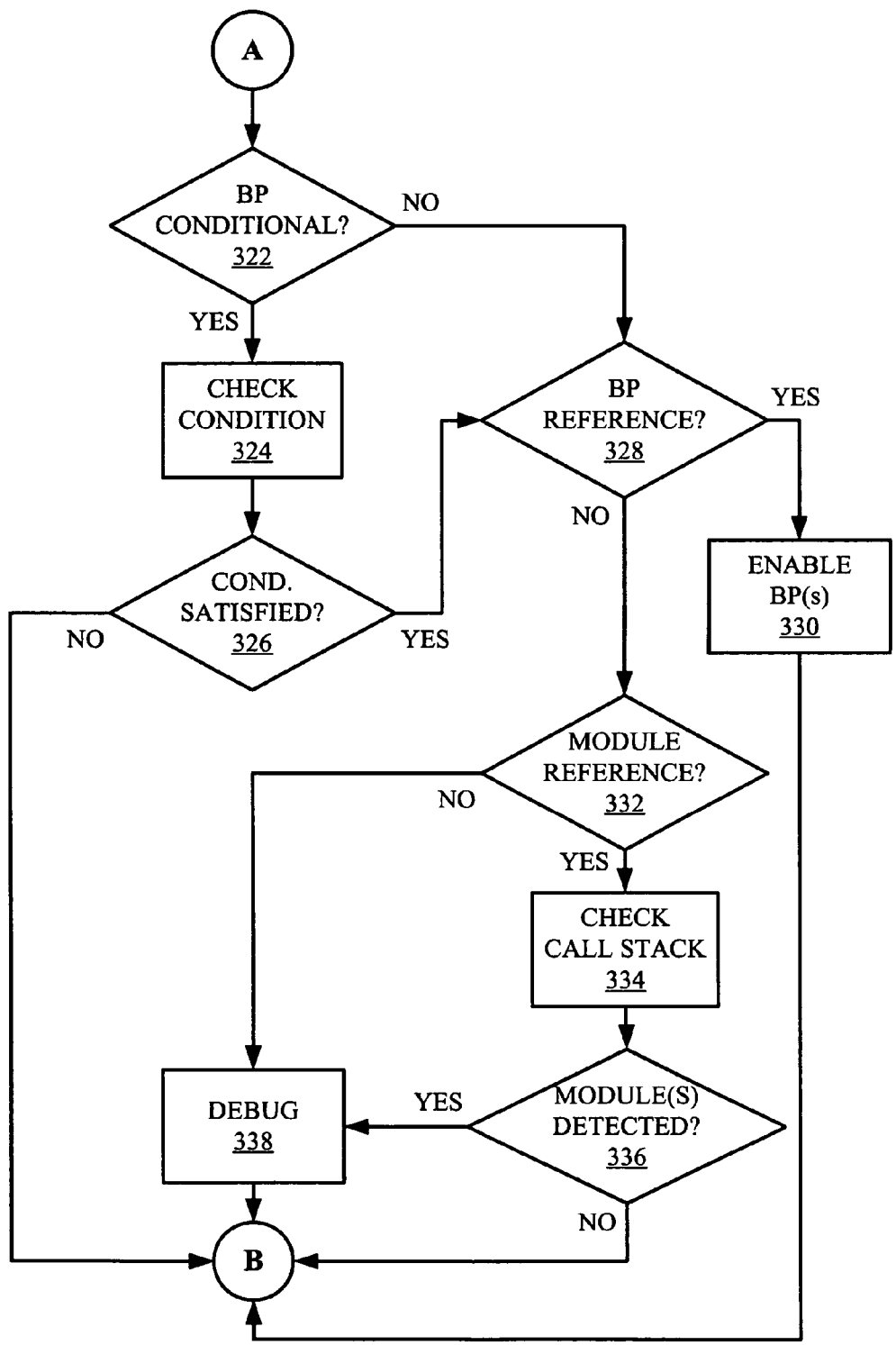
FIG. 7 is a flowchart of breakpoint processing associated with the Debug process of FIG. 6.

FIG. 7 is a flowchart of breakpoint processing 320 associated with the Debug process 300 of FIG. 6. Process 320 is accessed via transition point A (FIG. 6) and control proceeds immediately to a "Breakpoint (BP) Conditional?" block 322. It should be noted that transition point A is accessed when process 300 determines that there is a breakpoint, i.e. the "current breakpoint," associated with the current line of code during Breakpoint? Block 306. During block 322, process 320 determines whether or not the current breakpoint is a conditional breakpoint. This determination is based upon the value stored in attribute 266 of object 250 as described above in conjunction with FIG. 5. If process 320 determines that the current breakpoint is a conditional breakpoint, process 320 proceeds to a "Check Condition" block 324 during which process 320 calls checkCondition method 280 (FIG. 5) using condition attribute 270 (FIG. 5) as the parameter.

During a "Condition Satisfied?" block 326, determines, based upon the value returned from the call to method 280 during block 324, whether or not the condition associated with the current breakpoint has been satisfied. If the condition has not been satisfied, process 320 proceeds to transition point B and, as explained above, control returns to More Lines? Block 308 (FIG. 6) of process 300 and processing continues as described above in conjunction with FIG. 6.

If, during block 322, process 320 determines that the current breakpoint is not conditional or, during block 326 determines that the condition for execution is satisfied, process 320 proceeds to a "BP Reference?" block 328. During block 328, process 320 determines whether or not the current breakpoint references another breakpoint by examining the value of bpdIDPointer attribute 274 (FIG. 5)

If, during block 328, process 320 determines that the current breakpoint is a reference breakpoint, control proceeds to an "Enable BP(s)" block 330. During block 330, process 320 calls getBPD method 382 to retrieve the memory object 250 corresponding to the one or more breakpoints referenced in attribute 274. Process 320 then enables the one or more reference breakpoints by setting the corresponding bpEnabled attributes 276 (FIG. 5) to a value of '1', or TRUE. In this manner, when the reference breakpoints are encountered during execution, the breakpoints are executed. In an alternative embodiment, additional conditions may be stored either in the current breakpoint of the reference breakpoint to determine whether or not the reference breakpoint is executed when enabled. Following block 330, process 320 proceeds to transition point B and processing continues as described above.

If, during block 328, process 320 determines that the current breakpoint is not reference another breakpoint, process 320 proceeds to a "Module Reference?" block 332 during which determines whether or not the current breakpoint is a reference breakpoint by examining the contents of attribute 272 (FIG. 5) for a reference to specific module ID, which would include information corresponding to a module's call stack information. If attribute is non-NULL, i.e. refers to a module such as module_2 118 (FIG. 1), process 320 then proceeds to a "Check Call Stack" block 334 during which process 320 examines the current application's call stack for a reference to the one or more modules listed in attribute 272. During a "Module(s) Detected?" block 336, process 320 determines whether or not the one or more modules listed in attribute 272 were detected in the call stack examined during block 334. If not, processing proceeds to transition point B and processing continues as described above.

If, during block 336, process 320 determines that the one or more modules are present in the call stack or if, during block 332, process 320 determines that the current breakpoint does not reference a module, control proceeds to a "Debug" block 338 during which operation associated with standard debugging operations are executed. Those with skill in the computing and programming arts should appreciate the typical functionality of debugger 122 (FIG. 1). Process 320 then proceeds to transition point B (FIG. 6) and processing continues as described above in conjunction with FIG. 6.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for examining software, comprising:
   correlating a first breakpoint with a first programming module associated with computer software code executed by a processor;
   correlating a second breakpoint with a second programming module associated with the computer software code;
   detecting whether or not a reference to the second programming module is present in a call stack associated with the first breakpoint; and
   enabling the first breakpoint in response to a detection of the presence of the second programming module in the call stack.

2. The method of claim 1, further comprising detecting a condition associated with the second breakpoint is satisfied, wherein the first breakpoint is enabled when the condition is satisfied.

3. The method of claim 1, further comprising disabling the first breakpoint following execution of the first breakpoint.

4. The method of claim 1, the enabling of the first breakpoint further comprising detecting whether or not a reference to a third programming module is present in the call stack associated with the first breakpoint; wherein the enabling of the first breakpoint is in response to detection of both the second and third programming modules.

5. A system for debugging software, comprising:
   a memory;
   a processor coupled to the memory; and
   logic stored on the memory and executed on the processor for:
      correlating a first breakpoint with a first programming module associated with computer software code;
      correlating a second breakpoint with a second programming module associated with the computer software code;
      detecting whether or not a reference to the second programming module is present in a call stack associated with the first breakpoint; and
      enabling the first breakpoint in response to a detection of the presence of the second programming module in the call stack.

6. The system of claim 5, the logic further comprising logic for detecting a condition associated with the second breakpoint is satisfied, wherein the first breakpoint is enabled when the condition is satisfied.

7. The system of claim 5, the logic further comprising logic for disabling the first breakpoint following execution of the first breakpoint.

8. The system of claim 5, the logic for enabling of the first breakpoint further comprising logic for detecting whether or not a reference to a third programming module is present in the call stack associated with the first breakpoint; wherein the enabling of the first breakpoint is in response to detection of both the second and third programming modules.

9. A computer programming product for debugging software, comprising:
   a memory; and
   logic stored on the memory for execution on a processor for:
      correlating a first breakpoint with a first programming module associated with computer software code;
      correlating a second breakpoint with a second programming module associated with the computer software code;
      detecting whether or not a reference to the second programming module is present in a call stack associated with the first breakpoint; and
      enabling the first breakpoint in response to a detection of the presence of the second programming module in the call stack.

10. The computer programming product of claim 9, the logic further comprising logic for detecting a condition associated with the second breakpoint is satisfied, wherein the first breakpoint is enabled when the condition is satisfied.

11. The computer programming product of claim 9, the logic further comprising logic for disabling the first breakpoint following execution of the first breakpoint.

12. The computer programming product of claim 9, the logic for enabling of the first breakpoint further comprising logic for detecting whether or not a reference to a third programming module is present in the call stack associated with the first breakpoint; wherein the enabling of the first breakpoint is in response to detection of both the second and third programming modules.

* * * * *